United States Patent [19]

Duffany

[11] Patent Number: 5,070,453

[45] Date of Patent: Dec. 3, 1991

[54] SYSTEM AND METHOD FOR SCHEDULING DATA TRANSFERS AMONG A PLURALITY OF DATA PROCESSING UNITS TO AVOID CONFLICTING DATA REQUESTS

[75] Inventor: Jeffrey L. Duffany, Morristown, N.J.

[73] Assignee: AT&T Bell Laboratories, Murray Hill, N.J.

[21] Appl. No.: 335,333

[22] Filed: Apr. 10, 1989

[51] Int. Cl.$^5$ .......................................... G06F 15/20
[52] U.S. Cl. .................................... 364/402; 364/725
[58] Field of Search ............................ 364/400–402, 364/408, 200, 900, 406

[56] References Cited

U.S. PATENT DOCUMENTS

| | | | |
|---|---|---|---|
| 4,144,411 | 3/1979 | Frenkiel | 179/2 |
| 4,189,771 | 2/1980 | Roever | 364/200 |
| 4,328,543 | 5/1982 | Brickman et al. | 364/200 |
| 4,571,678 | 2/1986 | Chaitin | 364/300 |
| 4,744,028 | 5/1988 | Karmarkar | 364/402 |
| 4,782,444 | 11/1988 | Munshi et al. | 364/300 |
| 4,894,773 | 1/1990 | Lagarias | 364/402 |
| 4,914,563 | 4/1990 | Karmakar | 364/402 |

OTHER PUBLICATIONS

*The Computer Journal*, vol. No. 10, 1967, "An Upper Bound for the Chromatic Number of a Graph and its Application to Timetabling Problems", by D. J. A. Welsh and M. B. Powell, pp. 85–86.

*Primary Examiner*—Allen R. MacDonald
*Assistant Examiner*—Gail O. Hayes
*Attorney, Agent, or Firm*—A. G. Steinmetz

[57] ABSTRACT

A method for allocating resource use to a process having a plurality of tasks in which a set of signals identifying the interferences in resource use among the plurality of tasks is generated and a signal representing an initial non-interfering allocation is produced. The allocation signal is iteratively improved by 1) determining the correlations among the identified interferences, 2) comparing the determined correlations to prescribed criteria, 3) modifying the allocation signal in accordance with the determined correlations, and 4) reforming the interference signal set responsive to the determined correlations. When the determined correlations meet the prescribed criteria in the correlation determination, the corresponding allocation signal is selected as the optimum non-interfering allocation.

22 Claims, 13 Drawing Sheets

SYSTEM AND METHOD FOR SCHEDULING DATA TRANSFERS AMONG A PLURALITY OF DATA PROCESSING UNITS TO AVOID CONFLICTING DATA REQUESTS

FIELD OF THE INVENTION

The invention relates to allocation of resources and more particularly to assignment of resources in a multitask process.

BACKGROUND OF THE INVENTION

In industrial production, data processing and communication, most processes encountered involve carrying out multiple tasks with limited resources. It is therefore necessary to assign the limited resources to the tasks in a manner that assures implementation of the process in the most efficient manner. In processes involving only a few tasks, decisions as to resource assignment and task sequencing are made through manual analysis. As is well known, such manual analysis is not sufficient to optimize processes where the number of tasks and inter-relationships among the tasks are relatively complex. For example, it is a simple matter to arrange an examination schedule for a small group of students at an educational institution. Optimizing the scheduling of examinations for thousands of students at a large university, however, presents a difficult problem.

U.S. Pat. No. 4,744,028, issued to N. K. Kamarkar May 10, 1988, describes several linear programming methods adapted to scheduling problems and discloses a method and apparatus for optimizing resource allocation which extends the use of linear programming to the interior of a solution space polytope and iteratively determines an optimum solution by steepest descent analysis. The allocation method is particularly useful in allocation systems too large for practical implementation by linear programming methods.

Another technique known as "graph coloring" has been applied to resource allocation problems. Graph coloring is generally described in the article "An upper bound for the chromatic number of a graph and its application to timetabling problems" by D. J. A. Welsh and M. B. Powell appearing in the *Computer Journal*, Volume No. 10, 1967 at pages 85-86. It involves the formation of a graph having nodes representing objects joined by lines representing constraints describing the pairwise compatibility of each object with every other object.

U.S. Pat. No. 4,571,678, issued to G. J. Chaitin Feb. 18, 1986, discloses a register allocation and spilling scheme via graph coloring for an optimizing compiler that receives a high level source language and produces machine interpretable instruction. Computational data is assigned to a limited number of high speed computer registers where not enough such registers are available to store all the required data at a point in time. Register assignments are made building a register interference graph, coalescing nodes of the graph and coloring the graph using graph reduction techniques. If the number of registers is insufficient, the costs of using memory for each register is estimated and the graph is reconstructed until an acceptable allocation is made. U.S. Pat. No. 4,782,444, issued to A. A. Munshi et al Nov. 1, 1988, discloses a method for allocating and optimizing register assignments during compiling of source into executable code in either a scalar or vector processor. The method uses a pebble game heuristic played on each basic block dependency graph for local optimization.

The aforementioned graph coloring methods utilize graphical analysis or an iterative analysis of a computer list representation of a directed graph which involve either heuristic determinations or a relatively complex computational analysis of a graphical representation to obtain local optimization. Direct global optimization, however, is not available. It is an object of the invention to provide an improved resource allocation arrangement resulting in an optimum assignment of resources in a process that uses global optimization in each allocation step.

SUMMARY OF THE INVENTION

The foregoing is achieved by generating an array signal representative of the constraints among tasks of a process and a signal allocating the use of resources in a multitask process. The correlations among the elements of the constraint signal array are determined to modify the signal array and the allocation signal until a predetermined criterion is met.

The invention is directed to a method for assigning tasks and a set of resources used in the tasks in which a set of signals indicative of the interferences of resource usage is generated and a signal representing an allocation of resources is produced. The allocation signal is iteratively improved by 1) determining the correlations among the interferences, 2) reforming the interference signal set responsive to the determined correlations, and 3) modifying the allocation signal in accordance with the reformed interference signal set.

According to one aspect of the invention, the allocation signal is selected as the optimum non-interfering allocation signal when the interference set meets a predetermined criterion in correlation determination.

DETAILED DESCRIPTION

Figure 1:
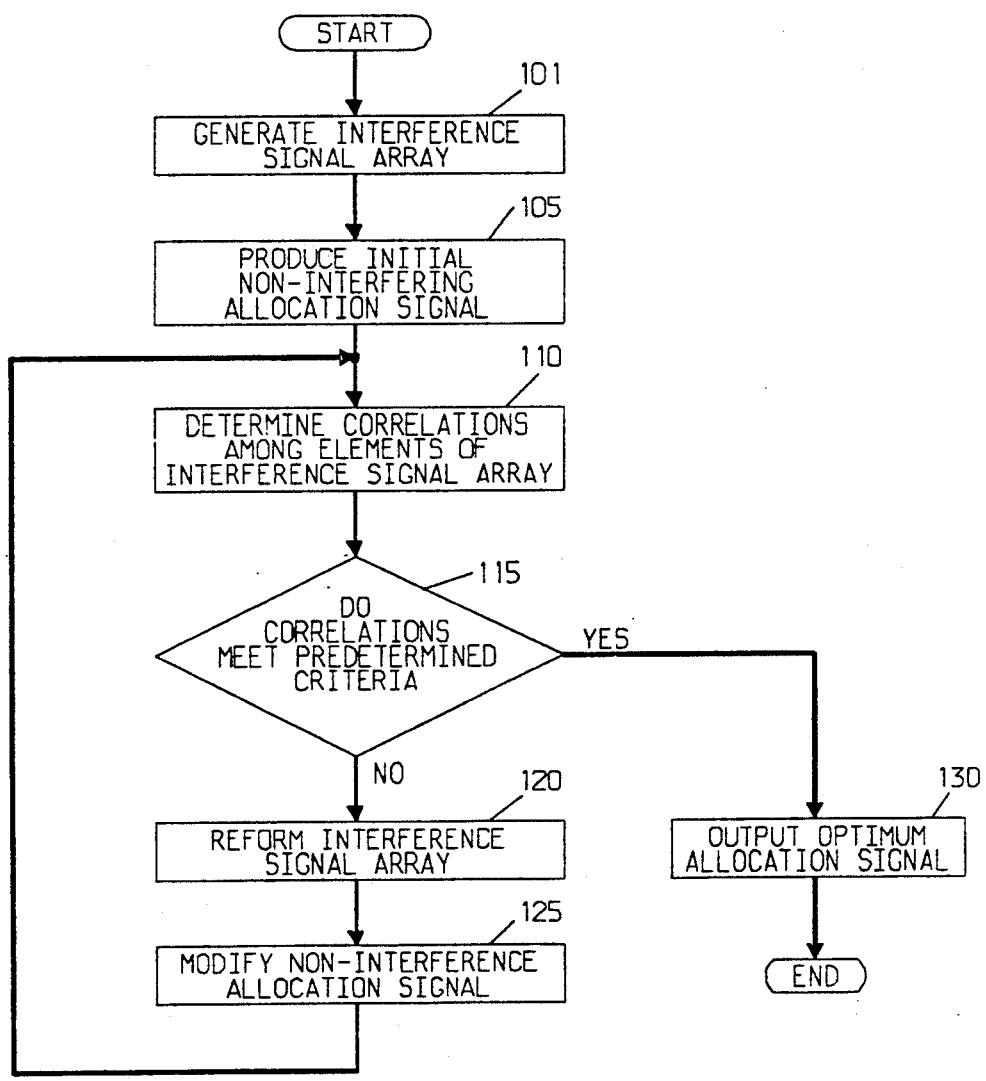
FIG. 1 is a flowchart depicting a general allocation method illustrative of the invention.

FIG. 1 is a generalized flowchart illustrative of the invention that is adapted to provide optimum usage for a process involving a set of tasks and a set of resources.

In general, the process of FIG. 1 may be considered as comprising a set of n objects and a set of constraints describing the pairwise compatibility of each object with every other object. The n objects can be represented as a vector $x=(x_1, x_2, x_3, \ldots x_n)$ that may be paired in $n(n-1)/2$ ways. The constraints can be expressed as $$i \; x_i 16 \; x_j \text{ for } i,j\epsilon(1,2,3 \ldots n), \; i \neq j \qquad (1)$$

The solution to equation (1) is a vector $s=(s_1, s_2, \ldots, s_n)$ where each element $s_i$ is an integer p such that $1 \leq p \leq k$ and $k \leq n$. All solutions are part of a set S and each individual solution $s_k$ is such that $k=\max(s_i)$. For every system of inequalities in equation (1), there exists at least one optimal solution $s_k*$ where $k* \leq k$ for all $s_k$ in S as well as a trivial solution $s=(1,2,3, \ldots n)$.

By way of illustration, consider the process of scheduling examinations for students at a large university where the courses represent objects in equation (1) and the students represent constraints. Each student may take more than one course so that there are conflicts or interferences in the examination scheduling. The solution vector S defines which exams can be scheduled concurrently and the total number of exam periods required. The minimum number of time periods is given by k* so that any two examinations can be scheduled in the same time period $(s_i=s_j)$. The trivial solution is the scheduling of a separate time period for each examination. As is apparent, an optimal solution results in the minimum number of time periods needed. Determining the optimal solution may require on the order of n? operations. Solving equation (1) by trial and error for a small number of objects, e.g., 10 requires approximately 3.6 million operations. A modest increase to $n=15$ increases this number to $10^{12}$. Where hundreds of courses are given at a university, selection of an optimal scheduling process is difficult. It is readily seen that the same principles apply to industrial and various technological processes which may require scheduling to optimize utilization of resources in real time.

The flowchart of FIG. 1 illustrative of the invention may be used to optimize a multitask process in which more than one task requires the use of a particular resource. For example, a multitasking computer operating system generally has conflicting demands on its resources. Referring to FIG. 1, a signal array representing the conflicts or interferences among the tasks is generated as indicated in step 101. The allocation may then be improved by determining the correlations in the interference signal array (step 110) and modifying the allocation signal (step 125). An initial allocation signal is produced (step 105) which avoids interferences between tasks. The initial allocation signal may correspond to the trivial solution where each task is performed at a separate time so that there is no interference in the use of resources. Alternatively, the initial allocation signal may correspond to a better solution previously found using the method illustrated in FIG. 1. For an optimum solution, the loop from step 110 to 125 is entered to iteratively evaluate and modify the interference signal array and the allocation signal until predetermined interference criteria are met. At that point, the optimum allocation signal is output in step 130.

In step 110, the interference array is analyzed to determine the correlations among the interference array elements. If the correlations do not meet the predetermined criteria of decision step 115, the correlations of step 110 are used to reform the interference signal array in step 120. In this manner, the determined correlations are used to improve the allocation. The non-interfering allocation signal is then modified (step 125) in accordance with the correlations determined in step 110. The loop from step 110 to step 125 is iterated to improve the allocation signal until predetermined criteria indicating an optimum solution are met in step 115.

Figure 2:
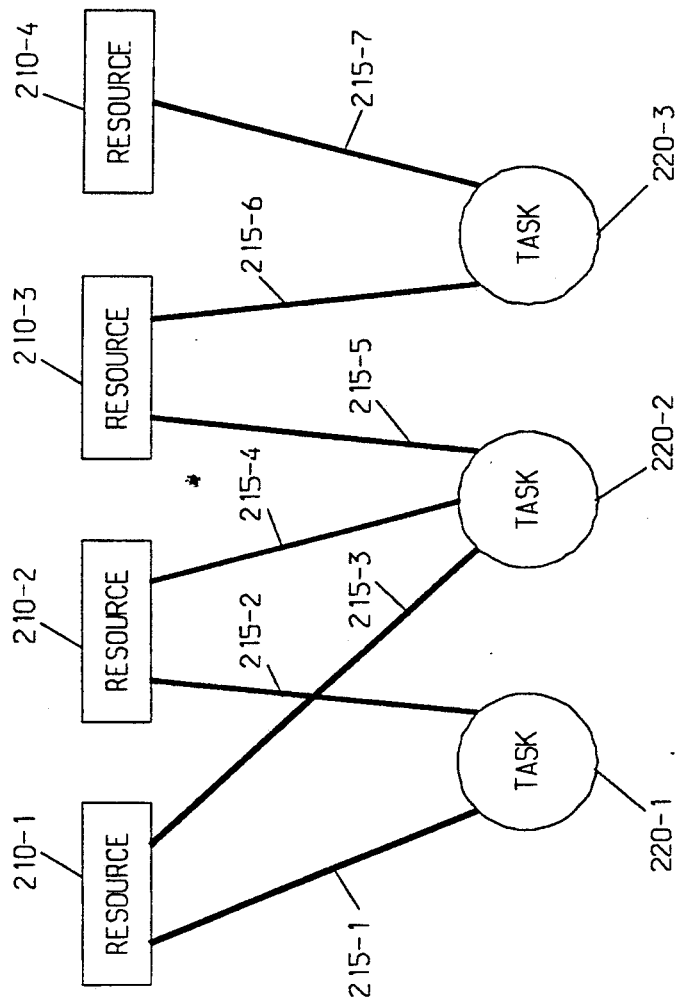
FIG. 2 shows a generalized process structure to which the allocation method of FIG. 1 may be applied.

FIG. 2 shows a graphical representation of resources and tasks for a process to which the allocation arrangement of the invention may be applied. The process of FIG. 2 is restricted to a limited number of tasks for purposes of illustration. It is to be understood, however, that the invention may be applied to processes involving a much larger number of tasks and processes with more complex resource usage interrelationships. The process illustrated in FIG. 2 involves three tasks, 220-1 through 220-3, to be performed with four resources 210-1 through 210-4. Task 220-1 requires resources 210-1 and 210-2 as indicated by lines 215-1 and 215-2. Task 220-2 requires resources 210-1, 210-2 and 210-3 and task 220-3 needs resources 210-3 and 210-4. As is readily seen, performing the process involves several conflicts or interference among the tasks. Tasks 220-1 and 220-2 are interfering since both require resources 210-1 and 210-2. Tasks 220-2 and 220-3 interfere with each other since both require resource 210-3. In accordance with the invention, the optimum sequence of tasks is selected to implement the process with the available resources.

Figure 3:
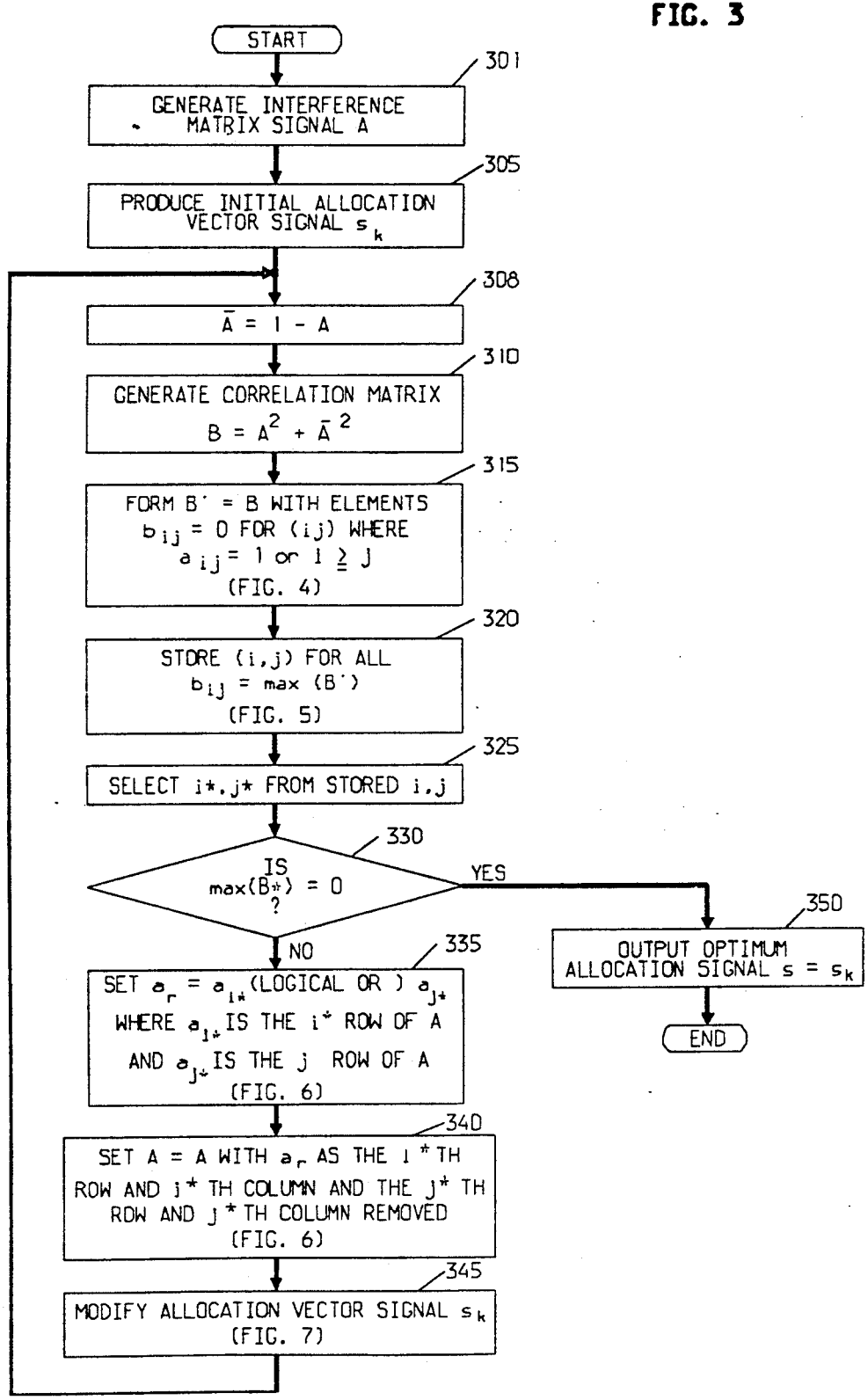
FIG. 3 shows a flowchart illustrating the operations of the flowchart of FIG. 1 in greater detail.
Figure 8:
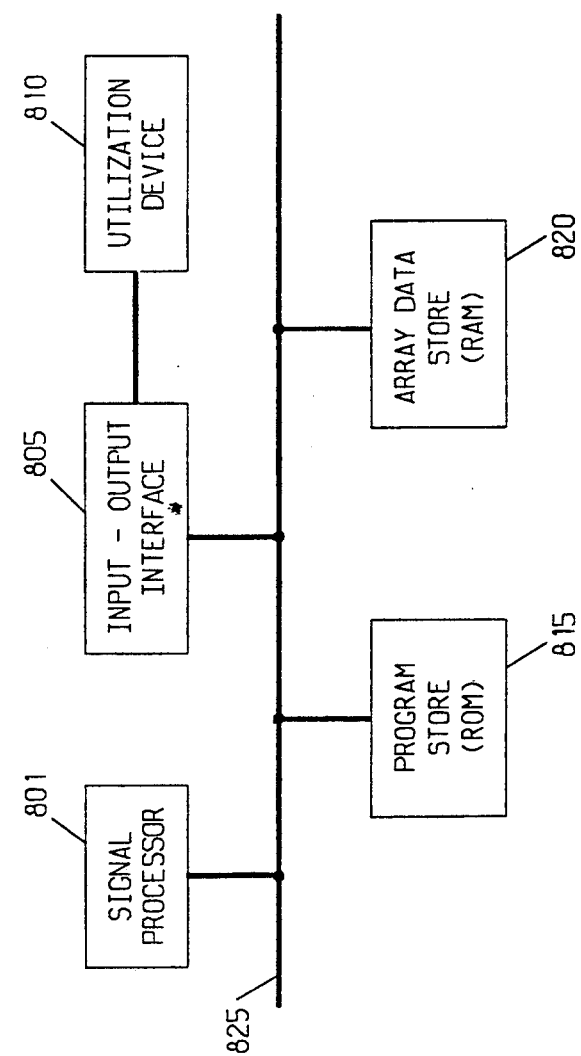
FIG. 8 depicts a data processing arrangement that may be used to implement the flowchart of FIG. 3.

FIG. 3 is a flow chart illustrating the general method used to optimize resource usage in a process according to the invention and FIG. 8 is a general block diagram of a data processing arrangement that may be used to implement the flowchart of FIG. 8. Referring to FIG. 3, a signal array is generated to represent the interferences between tasks $i=1,2,3, \ldots, N_T$ of a process due to resource limitations in step 301. As is readily seen from FIG. 2, tasks 220-1 and 220-2 both require resource 210-2 and cannot be performed at the same time. Tasks 220-2 and 220-3 are interfering because both require resource 210-3. Tasks 220-1 and 220-3 are non-interfering since each task uses different resources. The interference matrix signal A is generated in step 301 of FIG. 3. In general, the matrix signal is $$A = \begin{bmatrix} a_{11} a_{12} & \ldots & a_{1n} \\ a_{21} a_{22} & \ldots & a_{2n} \\ \cdot & \cdot & \cdot \\ \cdot & \cdot & \cdot \\ \cdot & \cdot & \cdot \\ a_{n1} a_{n2} & \cdots & a_{nn} \end{bmatrix} \qquad (2)$$

Element $a_{ij}$ sets forth the constraints between tasks i and j. Element $a_{ij}$ is set to one if there is an interference between tasks i and j and is set to zero if there is no interference between the tasks. It is assumed that a task does not interfere with itself. Thus, elements along the main diagonal $(a_{ii})$ are always zero. With respect to the process illustrated in FIG. 2, the signal array matrix is $$A = \begin{bmatrix} 0 & 1 & 0 \\ 1 & 0 & 1 \\ 0 & 1 & 0 \end{bmatrix} \qquad (3)$$

Element signals $a_{12}$ and $a_{21}$ are ones representing the conflicting requirement for resource 210-1 by tasks 220-1 and 220-2. Similarly, elements $a_{23}$ and $a_{32}$ are ones corresponding to the conflict for resource 210-3 by tasks 220-2 and 220-3. All other elements are zeros corresponding to no interferences. Each row of the matrix of equation (3) represents the interferences for a particular task. Row 1, for example, corresponds to the interference conditions of tasks 220-1, and 220-2 and 220-3 with respect to task 220-1. The one in row 1 shows the interference for task 220-1 caused by task 220-2.

Generation of the interference matrix may be readily accomplished by inputting the tasks and the resources required for each task and initially setting all elements $a_{ij}$ of the interference matrix to zero. The first row of the matrix is then produced by sequentially comparing the resources needed for the task 220-1 with the resources required for tasks 220-1 and 220-3. If the same resource is used in two tasks, the corresponding element of the interference matrix is changed to a one. Succeeding rows of the interference matrix are formed in similar fashion. Arrangements for generating interference matrices are shown with respect to particular examples in FIGS. 12 and 13.

Referring to FIG. 8, the processor arrangement therein includes signal processor 801, program store 815, array data store 820, input-output interface 805, bus 825 and utilization device 810. Store 815 contains a sequence of instructions corresponding to the flowchart of FIG. 3 adapted to control the signal processor 801, input-output interface 805 and data store 820 in the formation of an optimum allocation signal. Interface 805 receives the data required to construct an interference matrix and an initial allocation signal and outputs the resultant allocation signal. Data store 820 stores the interference matrix data, allocation signal data and correlation matrix data during the iterations of the process. Bus 825 is the communication link among the units of the processor arrangement. Utilization device 810 may comprise a data processing or network type system having resources and task facilities to perform a predetermined process.

After the interference signal matrix is formed, step 305 of FIG. 3 is entered in which an initial allocation vector signal $s_k = (s_1, s_2, \ldots s_n)$ is generated. With respect to FIG. 2, the allocation signal $s_k = (1,2,3)$ corresponding to the performance of each task in a separate time period is selected. This sequence is feasible but is not efficient since it requires the longest time. The correlations among the elements of matrix A are then determined in steps 308, 310, 315, 320 and 325. In step 308, the matrix signal $$\bar{A} = 1 - A \quad (4)$$

is formed. Each element of matrix signal $\bar{A}$ is the logical complement of the corresponding element of matrix signal A. For the process illustrated in FIG. 2, matrix signal $\bar{A}$ is $$\bar{A} = \begin{bmatrix} 1 & 0 & 1 \\ 0 & 1 & 0 \\ 1 & 0 & 1 \end{bmatrix} \quad (5)$$

Matrix signals A and $\bar{A}$ are combined to form a correlation matrix signal B is step 310 in accordance with $$B = A^2 + \bar{A}^2 \quad (6)$$

The B correlation matrix signal for the process of FIG. 2 is $$B = \begin{bmatrix} 3 & 0 & 3 \\ 0 & 3 & 0 \\ 3 & 0 & 3 \end{bmatrix} \quad (7)$$

Each element of signal matrix $A^2$ corresponds to the number of interferences two tasks have in common so that the signal matrix is a measure of the correlation of interferences or task compatibility. Each element of matrix $\bar{A}^2$ corresponds to the number of interferences two tasks do not have in common. Signal matrix $\bar{A}$ is therefore a measure of the correlation of non-interferences or task incompatibility. Correlation signal matrix B indicates both the maximum compatibility of tasks using the same resources and the maximum compatibility of tasks not using the same resources. While correlation signal matrix B is constructed according to equation (6), it is to be understood that other correlation matrices such as $A^2$, or $n - \min(A\bar{A}, \bar{A}A)$ may also be used.

The process of FIG. 2 may be improved by combining rows of signal matrix A to reduce the order of the matrix so that two or more tasks may be performed simultaneously. In accordance with the invention, the correlation matrix is used to reform the interference signal matrix and to modify the allocation signal. The B correlation matrix signal is modified to determine the best combination of elements to accomplish the signal matrix reduction. To do this, correlation matrix signal B* is formed in step 315. Element $b_{ij}$ of matrix signal B is set to zero where the corresponding element $a_{ij}$ of matrix signal A is either 1 or where $i \geq j$. With respect to FIG. 2, matrix signal B* is $$B^* = \begin{bmatrix} 0 & 0 & 3 \\ 0 & 0 & 0 \\ 0 & 0 & 0 \end{bmatrix} \quad (8)$$

Figure 4:
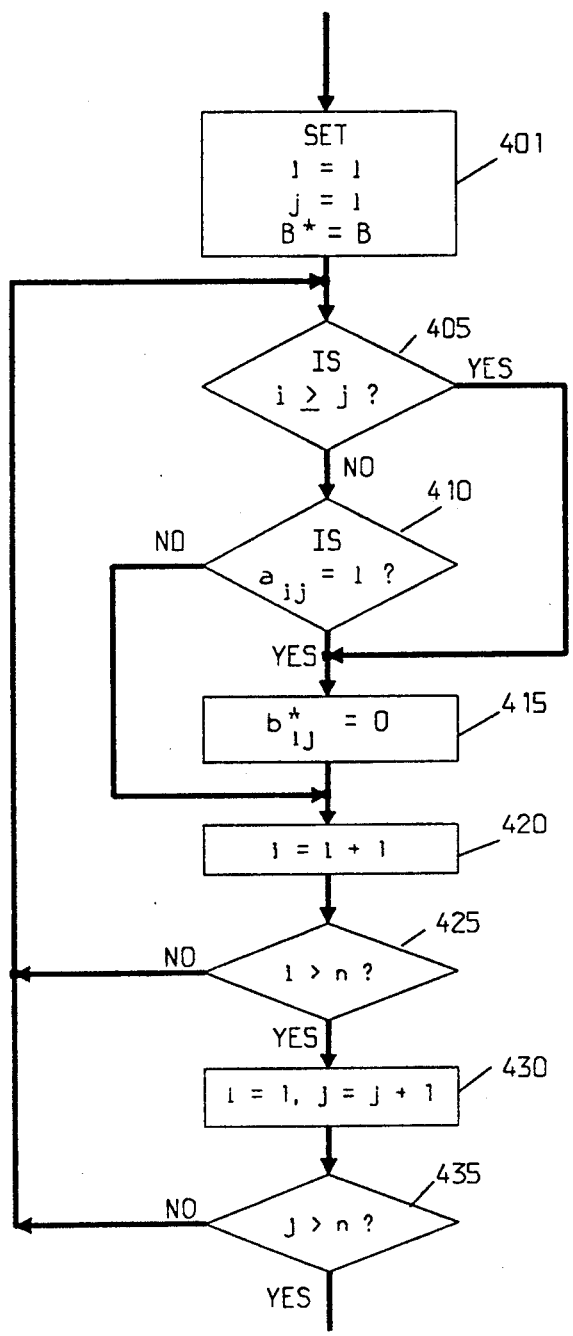
FIGS. 4-7 show various portions of the flowchart of FIG. 3 in greater detail.

FIG. 4 illustrates the operations of step 315 in greater detail. Initially, modified correlation matrix B* is set to correlation matrix B in step 401 and row index i and column index j are set to 1 to sequence through the elements of correlation matrix B*. If row index i is equal to or greater than column index j (step 405) or element $a_{ij}$ is equal to one (step 410), correlation matrix element $b^*_{ij}$ is set to zero in step 415. Otherwise, element $b^*_{ij}$ is unchanged from $b_{ij}$. Row index i is incremented (step 420) and the process of the loop from step 405 to step 425 is repeated for all row indices i until i is greater than the last row index n in step 425. Row index i is then reset to one, column index j is incremented to j+1 and control is passed to step 405. In this way, modified correlation matrix B* is formed from correlation matrix B.

Figure 5:
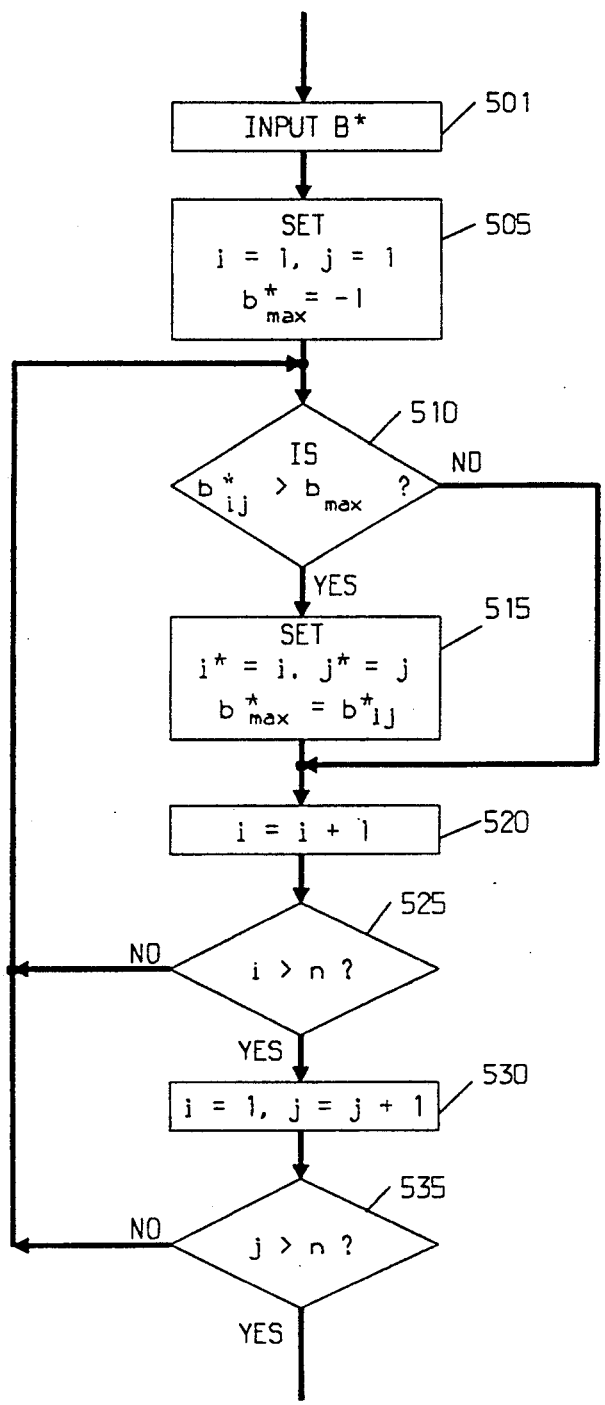

Referring to FIG. 3, the indices i,j for all elements of matrix signal B* having the maximum element value $$b^*_{ij} = \max(B^*) \quad (9)$$

are stored as signals i*j* (step 320). One such index i*j* is selected in step 325. The storing and selecting arrangement of steps 320 and 325 is shown in greater detail in FIG. 5. In FIG. 5, modified correlation matrix B* is accessed in step 501. Row index i and column index j are set to one and a less than minimum value is selected for $b^*_{max}$ in step 505. The current element $b^*_{ij}$ is compared to $b^*_{max}$ in step 515. If the current element $b_{ij}$ is greater than $b^*_{max}$ (step 510), indices i* and j* are set to i and j respectively and $b^*_{max}$ is set equal to element $b_{ij}$ (step 515). Otherwise, the processing of step 515 is skipped. Row index i is incremented in step 520 and until i is greater than n, the loop from step 510 to step 525 is iterated. When row index i is greater than n, it is reset to one and column index j is incremented to j+1 (step 530) so that the next column of the modified correlation matrix is processed. After the last element of matrix B* has been processed in the loop from step 510 to step 535, signal $b^*_{max}$ corresponds to the maximum value of elements $b^*_{ij}$. Signals i* and j* correspond to the location of an element with maximum correlation.

Referring back to FIG. 3, the value of max(B*)=$b^*_{max}$ is compared to zero in decision step 330. In the event that max(B*) is zero, the optimum allocation vector signal $s_k$ is output in step 330. Otherwise, the interference matrix signal A is reformed by producing the logical OR of row i* and column j* of interference matrix signal A. For the process of FIG. 2, the selected i* is 1 and the selected j* is 3. Since max(B*)=3 from equation (8), step 335 is entered from decision step 330. In step 335, the "logical or" of the elements of row i* and row j* of interference signal matrix A is formed. In the process of FIG. 2, row i* is 0, 1, 0 and row j* is 0, 1, 0. The "logical OR"

$$\text{for } i^* = 1 \quad j^* = 3$$
$$a_{i^*} = 0\ 1\ 0$$
$$a_{j^*} = 0\ 1\ 0$$
$$\overline{\phantom{aaaa}}$$
$$a_r = 0\ 1\ 0 \quad (10)$$

is formed.

Figure 6:
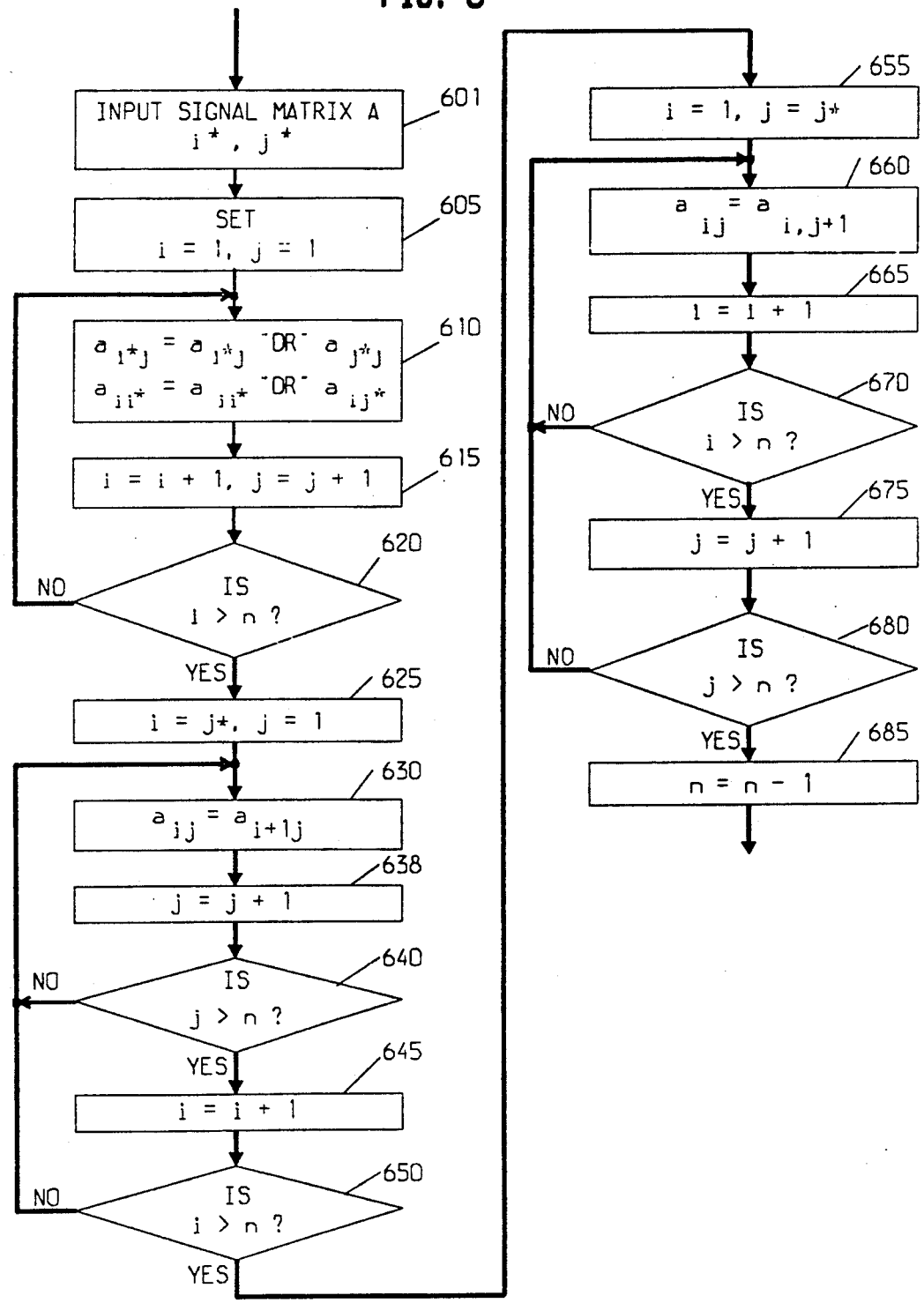

FIG. 6 illustrates the operations of steps 335 and 340 in greater detail. Referring to FIG. 6, interference signal matrix A and selected indices i* and j* are accessed from array data store 820 of FIG. 8 in step 601. Row index i and column index j are reset to one (step 605). Element $a_{i^*j}$ is set to the "logical or" of elements $a_{i^*j}$ and $a_{i^*j}$. Element $a_{ij^*}$ is set to the logical or of elements $a_{ii^*}$ and $a_{ij^*}$ in step 610. Indices i and j are incremented in step 615 and control is passed to step 610. When index i is greater than n in step 620, the i*th row and i*th column correspond to signal $a_r$ of equation (10).

In step 340 of FIG. 3, row j* and column j* are removed from the interference signal matrix A. The deletion of row j* and column j* is shown from step 615 to step 680 in FIG. 6. In the sequence from step 625 to step 650, every row from j* up is replaced by the next succeeding row. Row index i is set to j* and column index j is set to one in step 625. The elements of row i+1 are transferred to row i in the loop including steps 630 through 640. Row index i is incremented in step 645 and the row transfers are iterated until i is greater than n in step 650. Every column from j* up is replaced by the next succeeding column in the loop from step 655 to step 680. Row index i is initially set to one and column index i is initially set to j* in step 655. The elements of column j are replaced by the corresponding elements of column j+1 in the loop from step 660 to step 670. Column index j is then incremented in step 675 so that the column replacement is iterated until column index j is greater than n in step 680. The matrix size is reduced from n to n−1 in step 685.

For the process of FIG. 2, the interference signal matrix is reduced to $$A = \begin{bmatrix} 0 & 1 \\ 1 & 0 \end{bmatrix} \quad (11)$$

Figure 7:
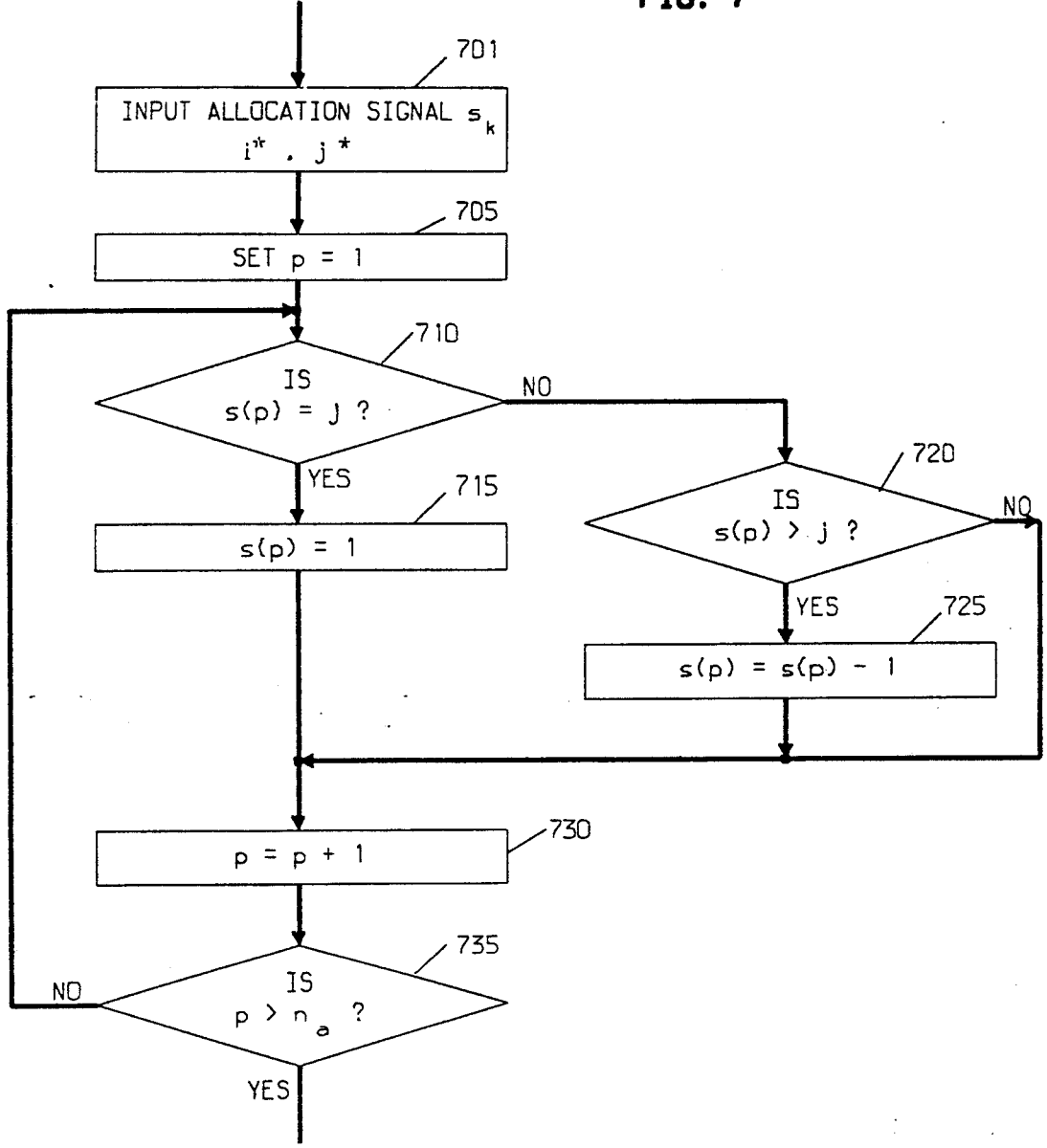

The allocation signal $s_k$ is then modified in step 345 to reflect the changes in the interference matrix obtained in step 340 as shown in greater detail in FIG. 7. Referring to FIG. 7, the allocation signal and i* j* signals are accessed from data store 820 in FIG. 8 (step 701). The allocation signal index p is set to one in step 705. If s(p) is equal to j in step 710, it is replaced by i (step 715) and control is passed to step 730. Otherwise, s(p) is compared to j in step 720. When s(p) is greater than j, its value is decremented in step 725, allocation signal index p is incremented in step 730 and the loop from step 710 through 735 is iterated until allocation index p is greater than $n_a$. $n_a$ corresponds to last element of allocation signal $s_k$. The modified allocation signal for the process of FIG. 2 is $$s_k = (1, 2, 1) \quad (12)$$

so that tasks 220-1 and 220-3 are performed simultaneously in a different time period than task 220-2. Equation 12 is more optimum allocation than the initial allocation which required a separate time period for each task.

Step 308 in FIG. 3 is then reentered so that the correlations of the reformed interference signal matrix can be determined in steps 308 through 325. Interference signal matrix $\overline{A}$ for the process of FIG. 2 formed from equation (11) becomes $$A = \begin{bmatrix} 1 & 0 \\ 0 & 1 \end{bmatrix} \quad (13)$$

The correlation signal matrix B generated in step 315 is then $$B = \begin{bmatrix} 2 & 0 \\ 0 & 2 \end{bmatrix} \quad (14)$$

and the modified correlation signal matrix produced in step 320 is $$B^* = \begin{bmatrix} 0 & 0 \\ 0 & 0 \end{bmatrix} \quad (15)$$

Since max(B*) determined in steps 320 through 330 is zero, the allocation signal of equation (12) is the best found and it is output in step 350.

The allocation signal of step 350 shows that tasks 220-1 and 220-3 can be performed in the same time period without interference and that task 220-2 must be performed in a separate time period to avoid interferences between resources. The process illustrated in FIG. 2 has been selected so that it may be readily checked by inspection of the figure. The invention, however, applies to the general case where the optimum allocation cannot be readily determined because of the complexity of the interferences.

Figure 9:
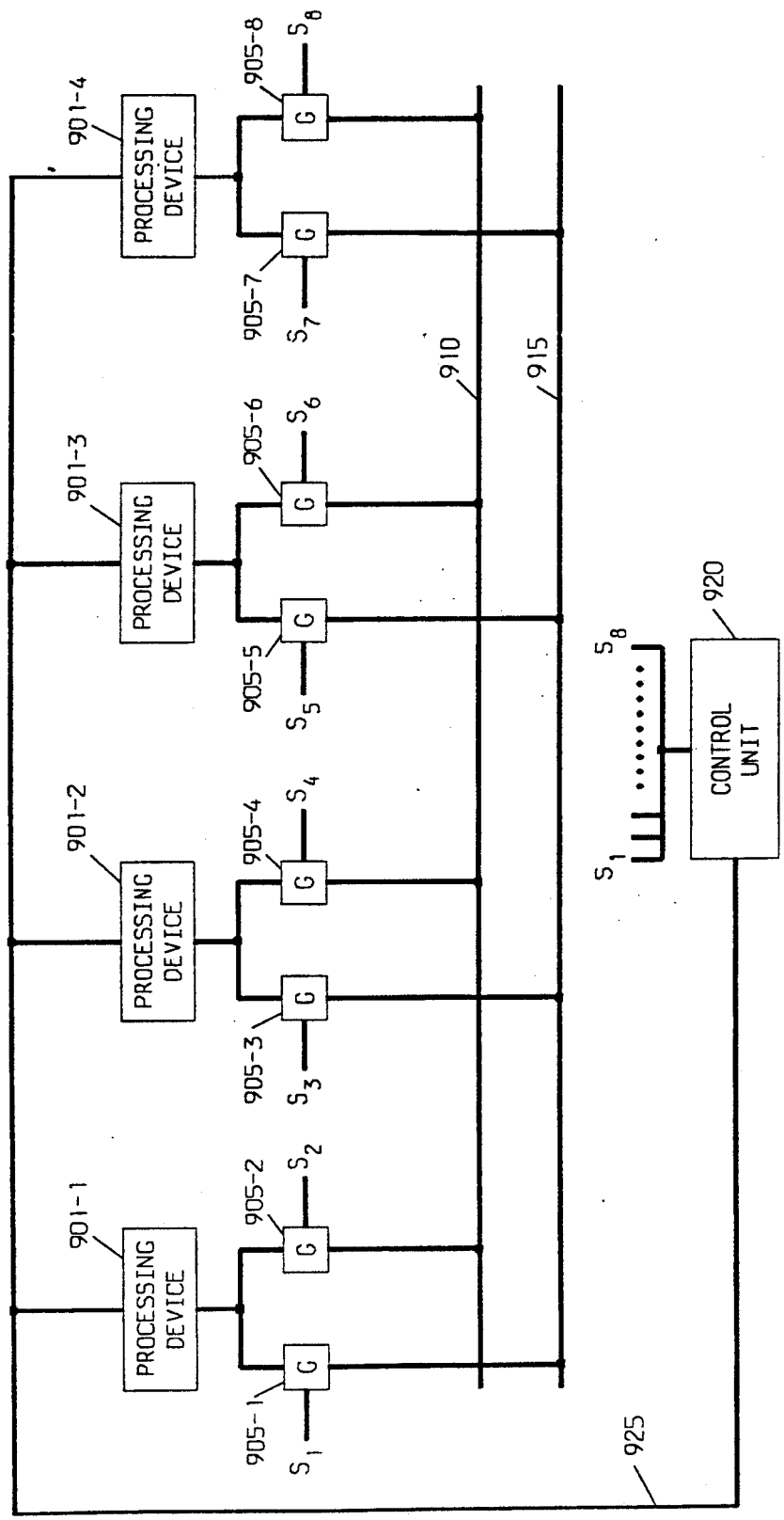
FIG. 9 shows an arrangement of data processing resources allocated in accordance with the flowchart of FIG. 3.

FIG. 9 illustrates how the allocation arrangement of FIGS. 3–8 may be used to control information transfers in a multiple processor data processing network. In FIG. 9, processors 901-1 through 901-4 are arranged to communicate over buses 910 and 915 under control of control unit 920. Each processor includes its own memory, signal processing unit and input-output port. A transfer control bus 925 is connected between control unit 920 and each processor so that each processor may send its communications requirements to the control unit. If, for example, processor 901-1 must transfer data to processor 901-2, a control signal is sent indicating the required task. Since the processors operate autonomously, there may be interfering tasks. Consequently, task scheduling is performed in control unit 920 in accordance with the invention to optimize the data transfers among processors 901-1 through 901-4.

Each processor in FIG. 9 has a prescribed number of input-output ports, e.g., one. This limitation permits only one incoming or outgoing data signal for a particular processor. A data signal from another source is an interfering signal that cannot be accommodated. An interference matrix table may be generated periodically on the basis of the task information received from the processors. Assume for purposes of illustration that control unit 920 has received the task information listed in the following Table 1.

TABLE 1

| Task | Data Transfer From | To |
|---|---|---|
| 1 | 901-1 | 901-2 |
| 2 | 901-2 | 901-3 |
| 3 | 901-3 | 901-4 |
| 4 | 901-4 | 901-1 |
| 5 | 901-4 | 901-2 |

The flowchart of FIG. 3 is entered and implemented in the processor arrangement of FIG. 8 to optimize the data transfer tasks in Table 1. Since the lists of tasks is different for each successive time period, the interference signal matrix is automatically generated as illustrated in FIG. 12.

Figure 12:
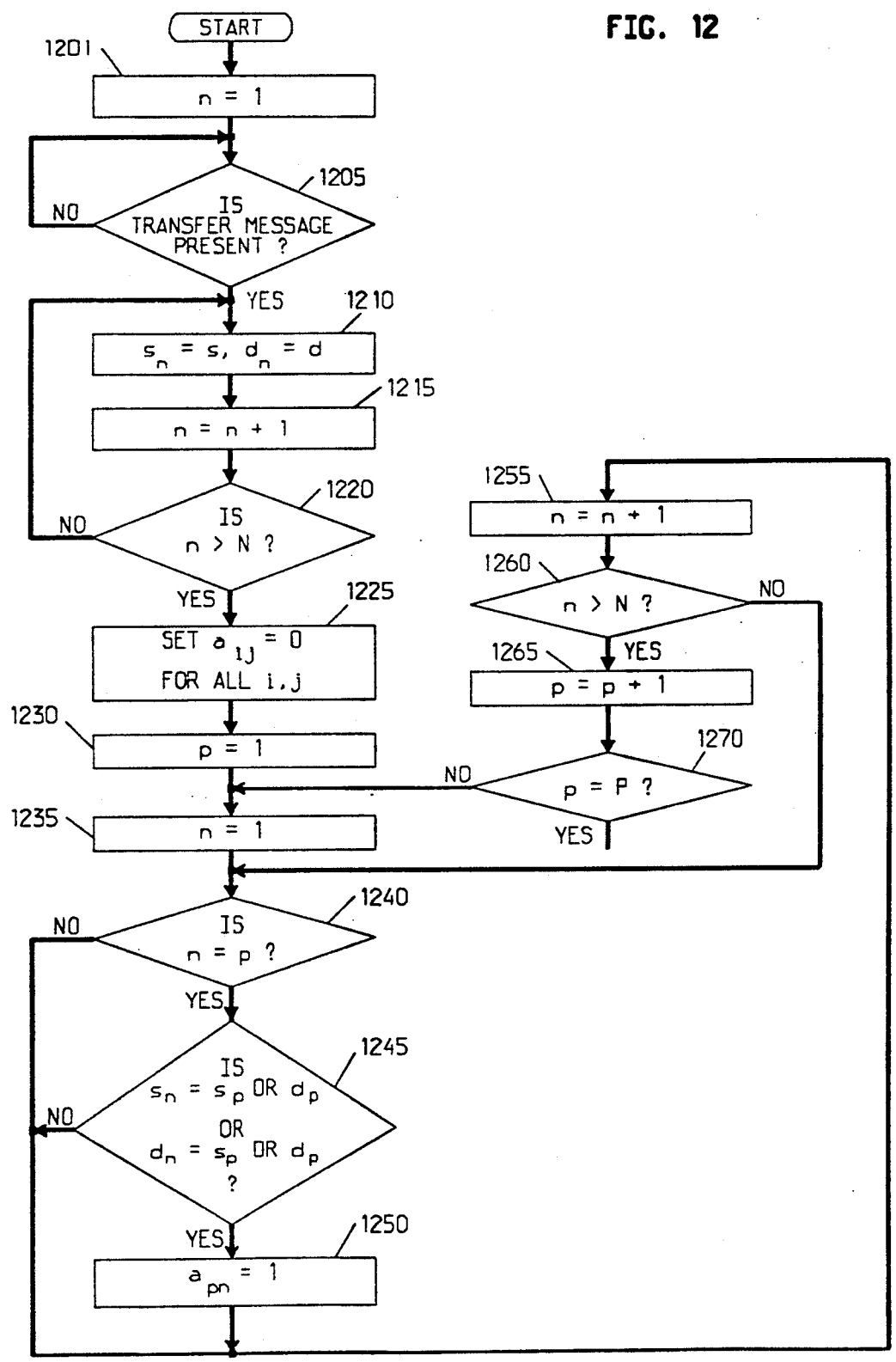
FIG. 12 shows a flow chart illustrating the formation of interference signal matrix in the flowchart of FIG. 3 for the arrangement of FIGS. 2 and 9.

Referring to FIGS. 12, a sequence of N transfer messages is processed in steps 1201 through 1220. The message transfer index n is set to one in step 1201. When a transfer message is received in step 1205, the source processor is stored as signal $s_n$. The destination processor is stored as signal $d_n$ (step 1210). Message index n is incremented (step 1215). Steps 1201 through 1220 are repeated until message transfer index n is greater than N. At this time, the interference signal matrix for the last N message transfers is generated in steps 1225 through 1270.

Initially, all elements $a_{aj}$ are set to zero (step 1225). Index p corresponding to the message transfer task row is set to one (step 1230) so that the first row of the interference matrix is addressed. Index n now corresponding to the columns of the interference matrix is set to one in step 1235. If column index n is equal to p in step 1240 no change is made to interference matrix element $a_{pn}$. Otherwise, step 1245 is entered. The source $s_n$ is tested against source $s_p$ and destination $d_p$ and destination $d_n$ is tested against source $s_p$ and destination $d_p$. If $s_n$ or $d_n$ corresponds to either $s_p$ or $d_p$ there is an interference between message transfers p and n. Interference matrix element $a_n$ is then set to one (step 1250).

Where the conditions of step 1245 are not met, interference matrix element $a_{pn}$ remains unchanged. Column index n is incremented in step 1255 and step 1230 is reentered via step 1260 until the last message transfer N is processed. Row index p is then incremented in step 1265 to begin formation of the next row of the interference matrix in step 1235 as long as row index p is not greater than N (step 1270).

The interference signal matrix generated for the tasks listed in Table 1

$$A = \begin{bmatrix} 0 & 1 & 0 & 1 & 1 \\ 1 & 0 & 1 & 0 & 1 \\ 0 & 1 & 0 & 1 & 1 \\ 1 & 0 & 1 & 0 & 1 \\ 1 & 1 & 1 & 1 & 0 \end{bmatrix} \quad (16)$$

an the initial allocation signal is $$s = (1,2,3,4,5) \quad (17)$$

corresponding to the performance of the tasks in Table 1 in sequential order. As a result of the operations of steps 308 through 325 of FIG. 3, the modified correlation of signal matrix for Table 1 is $$B^* = \begin{bmatrix} 0 & 0 & 5 & 0 & 0 \\ 0 & 0 & 0 & 5 & 0 \\ 0 & 0 & 0 & 0 & 0 \\ 0 & 0 & 0 & 0 & 0 \\ 0 & 0 & 0 & 0 & 0 \end{bmatrix} \quad (18)$$

$i^* = 2$, $j^* = 4$ and max($B^*$) = 5. In accordance with step 335, the interference signal matrix is reformed as $$A = \begin{bmatrix} 0 & 1 & 0 & 1 \\ 1 & 0 & 1 & 1 \\ 0 & 1 & 0 & 1 \\ 1 & 1 & 1 & 0 \end{bmatrix} \quad (19)$$

The non-interfering allocation signal becomes $$s_k = (1,2,3,2,4) \quad (20)$$

indicating that the data transfer from processor 901-2 to processor 901-3 (task 2) may take place simultaneously with the data transfer from processor 901-4 to processor 901-1 (task 4).

Step 308 of FIG. 3 is then reentered and steps 308 through 330 are performed in the processor arrangement of FIG. 8 to determine if a further improvement may be made to the allocation signal. The modified allocation signal matrix obtained in step 315

$$B^* = \begin{bmatrix} 0 & 0 & 4 & 0 \\ 0 & 0 & 0 & 0 \\ 0 & 0 & 0 & 0 \\ 0 & 0 & 0 & 0 \end{bmatrix} \quad (21)$$

results in $i^* = 1$, $j^* = 3$ and max($B^*$) = 4 in steps 320 and step 325. Since max($B^*$) is not zero, $a_r = 0\ 1\ 0\ 1$ \hfill (22)

the logical or of the elements of rows 1 and 3 is produced in step 335 and the interference signal matrix for the process of Table 1 is reformed in step 340 to be $$A = \begin{bmatrix} 0 & 1 & 1 \\ 1 & 0 & 1 \\ 1 & 1 & 0 \end{bmatrix} \quad (23)$$

The non-interfering allocation signal is modified in step 345 to be $s_k = (1,2,1,2,3)$ \hfill (24)

Every element of the modified correlation signal matrix B* obtained for the interference signal array A of equation (23) is zero. Consequently, the allocation of equation (24) is the best obtainable and signal $s_k$ is output in step 350.

In FIG. 9, control unit 920 is operative to signal processors 901-1, 901-2, 901-3 and 901-4 to transfer data. It also operates to close switches 905-1, 905-3, 905-6 and 905-8 to permit the data transfer between processor 901-1 and 901-2 (task 1 of Table 1) over bus 915 and the data transfer between processors 901-3 and 901-4 (task 3 of Table 1) over bus 910 in a first time period. Processors 901-2, 901-3, 901-4 and 901-1 are alerted to transfer data and switches 905-3, 905-5, 905-8 and 905-2 are closed in a second time period. This allows the data transfer between processors 901-2 and 901-3 (task 2 of Table 1) over bus 915 concurrently with the data transfer between processors 901-4 and 901-1 (task 4 of Table 1) over bus 910. In a third time interval, processors 901-4 and 901-2 are alerted and switches 905-3 and 905-7 are closed to allow the data transfer between processors 901-4 and 901-2 (task 5 of Table 1) over bus 915. Tasks 1 through 5 of Table 1 are then performed in optimal manner without interference over the limited bus resources.

In the arrangement of FIG. 9, the allocation processing is performed for a group of N messages. It is to be understood that other arrangements may be used for message transfer allocation. For example, the messages may be received during a prescribed time period and allocation processing may be performed in a succeeding set time interval. Each successive allocation signal is an improvement over the preceding one. In the event that an optimum allocation is not obtained in the set time interval, the last generated allocation signal can be used.

Figure 10:
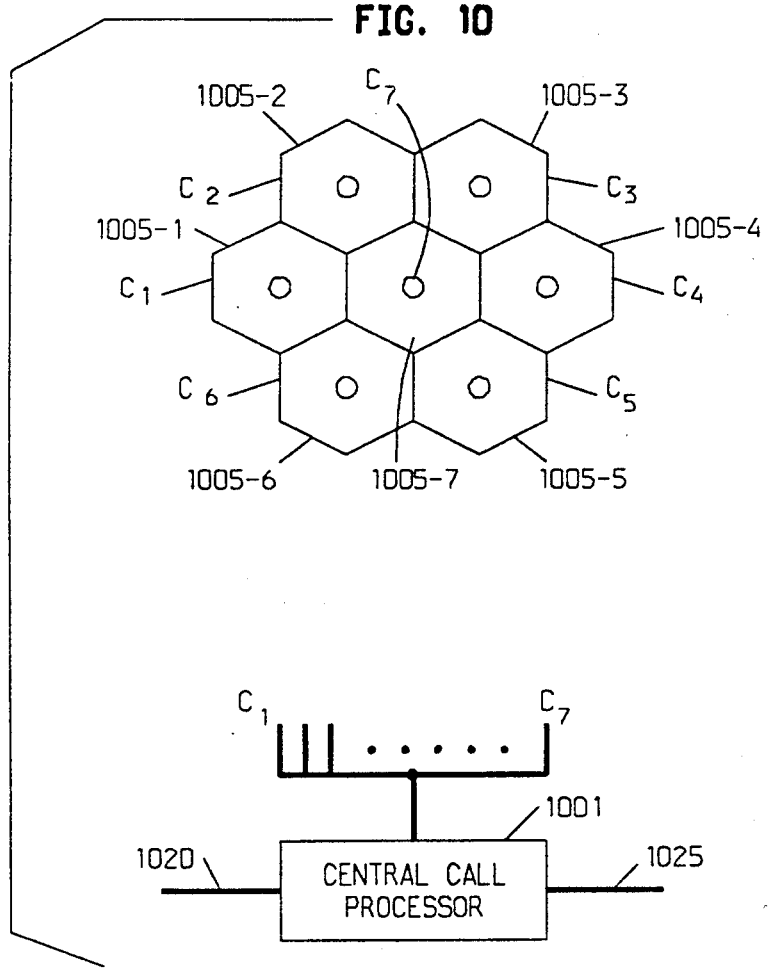
FIG. 10 shows an arrangement of cells in a cellular communication system in which cell and frequency assignments are made in accordance with the flowchart of FIG. 3.

FIG. 10 shows a general diagram illustrating a cellular communication system well known in the art. In FIG. 10, a geographical area is partitioned into adjacent cells 1005-1 through 1005-7 shown as hexagons. Each cell provides communication to mobile units within the cell over a plurality of radio channels via cell site equipment and an antenna having a radiation pattern that covers the cell. Central call processor 1001 is connected to a switched telephone network via lines 1110 and 1120 and to each cell via lines $C_1$ through $C_7$. The central call processor provides a talking path for each call it originates by assigning a specific frequency channel. The system in FIG. 10 may have N frequency channels which frequencies are divided into n groups of different frequencies. A group is assigned to a particular cell.

Figure 11:
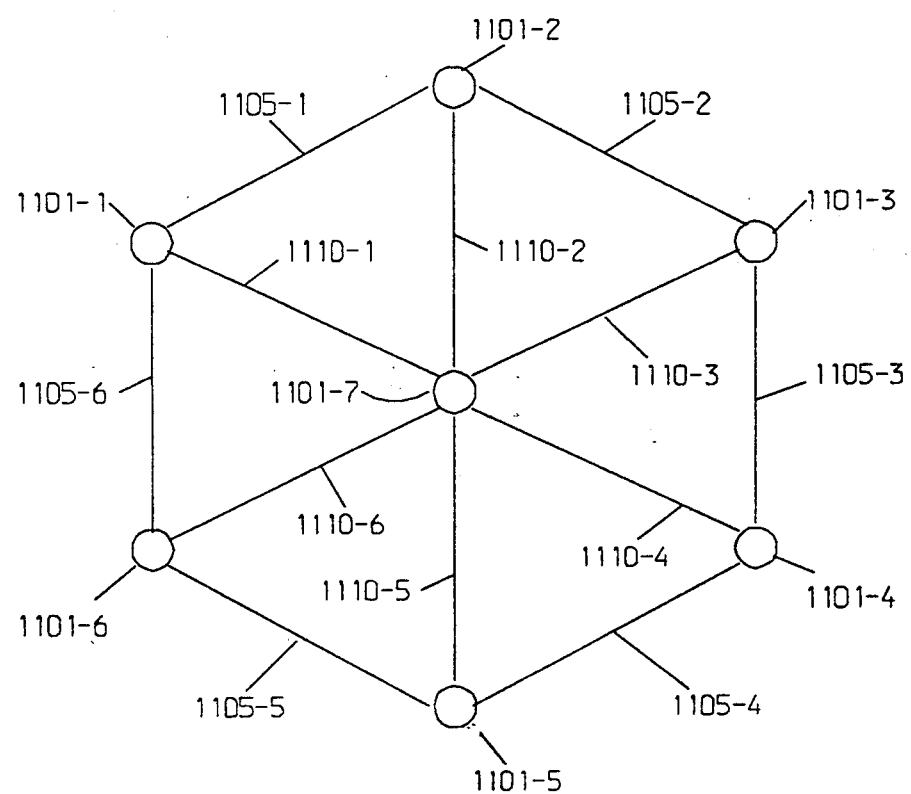
FIG. 11 shows a graphical representation of the interference constraints in the arrangement of FIG. 10.

Because of antenna radiation pattern overlap, it is assumed that a frequency in use in any one cell interferes with the same frequency in the same or any neighboring cell. For example, once a particular frequency is assigned to cell 1005-7, the same frequency cannot be used in any of cells 1005-1 through 1005-6. Similarly, assignment of a frequency to cell 1005-1 precludes assignment of the same frequency to neighboring cells 1005-2, 1005-6 or 1005-7. FIG. 11 is a graph that illustrates the interferences among the cells of FIG. 10. A vertex or node in FIG. 10 corresponds to a cell and an edge or line between two cells represents an interference. Node 1101-7 corresponds to cell 1005-7 and lines 1110-1 through 1110-6 indicate the interferences with nodes 1101-1 through 1101-6 corresponding to cells 1005-1 through 1005-6, respectively. Thus, the group of frequencies assigned to cell 1005-7 cannot be used in cells 1005-1 through 1005-6. Similarly, the group of frequencies assigned to cell 1005-1 must be different from the groups assigned to cells 1004-2, 1005-6 and 1005-7.

Figure 13:
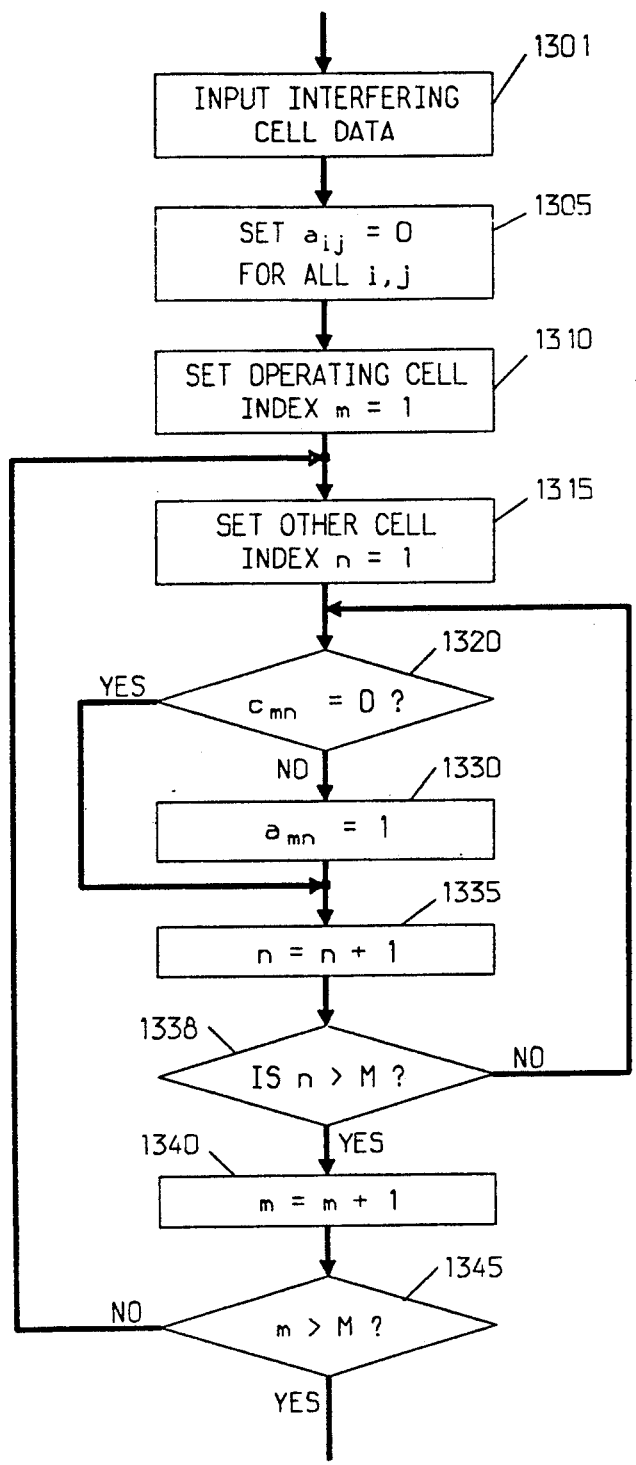
FIG. 13 shows a flowchart illustrating the formation of interference signal matrix in the flowchart of FIG. 3 for the communication arrangement of FIG. 10.

The cell pattern shown in FIG. 10 may change as demand for service changes. It may be necessary to add cells to cover a larger geographical area. Cells may be split to accommodate greater traffic demand in an area as described in U.S. Pat. No. 4,144,411, issued to Richard H. Frankiel Mar. 13, 1979. As a result, the interference pattern illustrated in FIG. 11 may change. In accordance with the invention, central call processor 1001 includes a processing arrangement such as shown in FIG. 9 to implement the flowchart of FIG. 3. In this way, the assignment of frequencies to the cells of FIG. 10 can be optimized. Referring to FIG. 3, the interference signal matrix A is generated (step 301) as illustrated in the flowchart of FIG. 13, the interfering cell data for the current cell configuration is input in step 1301. This may be done by listing the cells and entering a one for cells that interfere and a zero for cells that do not interfere.

Table 2 shows a listing for the arrangement of FIG. 10:

TABLE 2

| Operating Cell $c_m$ | Interfering Cells $c_{mn} = 1$ | Non-interfering Cells $c_{mn} = 0$ |
|---|---|---|
| 1 | 2,6,7 | 3,4,5 |
| 2 | 1,3,7 | 4,5,6 |
| 3 | 2,4,7 | 1,5,6 |
| 4 | 3,5,7 | 1,2,6 |
| 5 | 4,6,7 | 1,2,3 |
| 6 | 1,5,7 | 2,3,4 |
| 7 |  | 1,2,3,4,5,6 |

For each cell $c_m$ of column 1 of Table 2, a zero is entered for noninterfering cells $c_{mn}$ (Table 2 column 3) and a one is entered for interfering cells $c_{mn}$ (Table 2 column 2). With respect to $c_1$ (cell 1005-1), for example, a one is inserted for interfering cells $c_{12}$ (1005-2), $c_{16}$ (1005-6) and $c_{17}$ (1005-7) and a zero is inserted for non-interfering cells $c_{13}$ (1005-3), $c_{14}$ (1005-4) and $c_{15}$ (1005-5). All elements $a_{ij}$ of the interference matrix are initially set to zero (step 1305) and the operating cell index m as well s the interference index n are set to one (steps 1310 and 1315). The interference cell signals are tested in step 1320. If the interference cell signal $c_{mn}$ is a one, the corresponding element $a_{mn}$ is set to one (step 1330). Otherwise, element $a_{mn}$ remains zero. Index n is incremented (step 1335) and the incremented value is compared to the last cell value M (step 1338). Until n is greater than M, the loop from step 1315 through 1338 is iterated so that all elements for row m of the interference matrix are generated.

Upon completion of row m of the interference signal matrix, index m is incremented (step 1340) and control is returned to step 1315 until the last row M is processed (step 1345). The interference signal matrix generated in FIG. 13 for the cellular communication arrangement of FIG. 10 is $$A = \begin{bmatrix} 0 & 1 & 0 & 0 & 0 & 1 & 1 \\ 1 & 0 & 1 & 0 & 0 & 0 & 1 \\ 0 & 1 & 0 & 1 & 0 & 0 & 1 \\ 0 & 0 & 1 & 0 & 1 & 0 & 1 \\ 1 & 0 & 0 & 0 & 1 & 0 & 1 \\ 1 & 1 & 1 & 1 & 1 & 1 & 0 \end{bmatrix} \quad (25)$$

The first row of equation (25) reflects the interferences in frequency assignments between cell 1005-1 and cells 1005-2, 1005-6 and 1005-7 and the last row reflects the interferences between cell 1005-7 and cells 1005-1 through 1005-6.

An initial allocation vector signal $$s_k = (1,2,3,4,5,6,7)$$

is produced in step 305 of FIG. 3. Signal $s_k$ corresponds to an allocation of a different frequency group to each cell in FIG. 10. Each cell is a different cell type and there is no reuse of a frequency group in FIG. 10. The modified correlation signal matrix obtained for equation (25) is $$B^* = \begin{bmatrix} 0 & 0 & 5 & 3 & 5 & 0 & 0 \\ 0 & 0 & 0 & 5 & 3 & 5 & 0 \\ 0 & 0 & 0 & 0 & 5 & 3 & 0 \\ 0 & 0 & 0 & 0 & 0 & 5 & 0 \\ 0 & 0 & 0 & 0 & 0 & 0 & 0 \\ 0 & 0 & 0 & 0 & 0 & 0 & 0 \end{bmatrix} \quad (26)$$

There are six occurrences of maximum correlation elements max(B*). In accordance with steps 320 and 325 as shown in the flowchart of FIG. 3, the last maximum value element at row 4 column 6 is selected. It is to be understood that other maximum value element selection criteria could be used. For example, the element of value max(B*) having a corresponding element of maximum value in the signal matrix A² may be selected in step 325. Since max(B*) in step 330 is non-zero, the interference matrix is reformed in steps 335 and 340 and the allocation vector signal is modified in step 345. The sequence of allocation signals obtained as a result of the iterations in FIG. 3 until max(B*) is zero in step 330 is listed in Table 3.

TABLE 3

| Iteration $s_k$ | Frequency Allocation Cell Types |
|---|---|
| 1 | 1 2 3 4 5 6 7 |
| 2 | 1 2 3 4 5 4 6 |
| 3 | 1 2 3 2 4 2 5 |
| 4 | 1 2 3 2 3 2 4 |
| 5 | 1 2 1 2 1 2 3 |

The initial allocation of line 1 of Table 3 defines 7 cell types and requires 7 distinct groups of frequencies so that only 1/7 of the total number of channels is available in each cell. Line 3 of Table 3 defines 5 cell types whereby each cell has available 1/5 of the total number of channels. Cells 1005-2, 1005-4 and 1005-6 are type 2 and may use the same group of frequencies without interferences. Separate frequency groups are required for cells 1005-1, 1005-3, 1005-5 and 1005-7. Line 5 of Table 3 corresponds to the optimum allocation which requires only 3 cell types. The optimum allocation of line 5 of Table 3 permits the one group of frequencies to be used in cells 1005-1, 1005-3, 1005-5, another group of frequencies to be used in cells 1005-2, 1005-4 and 1004-6 and a third group of frequencies to be used in cell 1005-7. As a result, each cell has available ⅓ of the total number of channels and can accommodate a substantially larger number of calls. In the event the cell configuration of FIG. 10 is altered to accommodate a different traffic pattern, the frequency allocation may be readily changed to obtain optimum frequency usage.

The invention has been described with reference to illustrative embodiments thereof. It is apparent, however, to one skilled in the art that various modifications and changes may be made without departing from the spirit and scope of the invention.

I claim:

1. A method for scheduling data transfers among a plurality of processing devices over a predetermined number of message carrying channels comprising the steps of:
   receiving a plurality of requests for data transfers from said processing devices;
   identifying conflicts in requested data transfers by generating a signal identifying the interferences in data carrying channels among the message transfer requests;
   specifying an initial transfer schedule by selecting a signal representing a non-interfering data transfer schedule; and
   improving the non-interfering message transfer schedule signal including;
   determining correlations in the identified data carrying channel interferences signal among the message transfer requests;
   comparing the determined correlations in the identified data carrying channel interferences signal to predetermined criteria,
   modifying the non-interfering data transfer schedule signal responsive to the determined correlations, and
   reforming the signal identifying the interferences in data carrying channels among the data transfer requests responsive to the determined correlations,
   the sequence of determining, comparing, modifying and reforming steps being repeated until the determined correlations meet the predetermined criteria in the comparing step "scheduling said data transferred to selected processing devices in response to said sequences of determining, comparing, modifying, and reforming, " and "performing said data transfers".

2. A method for scheduling data transfers among a plurality of processing devices over a predetermined number of data carrying channels according to claim 1 wherein the step of generating a signal identifying the interferences in data carrying channels among the data transfer requests includes forming a set of signals each indicative of a concurrent requirement for at least one data carrying channel by two or more of the plurality of the data transfer requests.

3. A method for scheduling data transfers among a plurality of processing devices over a predetermined number of data carrying channels according to claim 2 wherein the step of forming a set of signals each indicative of a concurrent requirement for at least one data carrying channel by two or more of the plurality of data transfer requests comprises generating an array of signals each representing the data carrying channel interferences between a pair of the plurality data transfer requests.

4. A method for scheduling data transfers among a plurality of processing devices over a predetermined number of data carrying channels according to claim 1 wherein the step of determining the correlations of the identified data carrying channel interferences among the data transfer requests comprises forming an array of first signals each representative of the compatibility of data carrying channels between a selected message transfer request and the plurality of message transfer requests responsive to the signal identifying the interferences in message carrying channels among the message transfer requests.

5. A method for scheduling data transfers among a plurality of processing devices over a predetermined number of data carrying channels according to claim 4 wherein each first signal comprises a set of element signals, each element signal having a value representative of the compatibility in message carrying channels between the selected data transfer request and one of the plurality of data transfer requests.

6. A method for scheduling data transfers among a plurality of processing devices over a predetermined number of data carrying channels according to claim 5 wherein the step of determining the correlations of the identified data carrying channel interferences among the data transfer requests further comprises generating a data carrying channel interference correlation signal array-responsive to the first signal array.

7. A method for scheduling data transfers among a plurality of processing devices over a predetermined number of data carrying channels according to claim 5 wherein the compatibility signal formation further comprises forming an array of second signals each representative of the incompatibility of data carrying channels between a selected data transfer request and the plurality of data transfer requests and comprising a set of element signals, each signal having a value representative of the incompatibility in data carrying channels between the selected data transfer and one of the plurality of data transfer requests.

8. A method for scheduling data transfers among a plurality of processing devices over a predetermined number of data carrying channels according to claim 7 wherein the step of determining the correlations of the identified data carrying channel interferences among the data transfer requests further comprises combining the first and second signal arrays to generate a data carrying channel interference correlation signal array.

9. A method for scheduling data transfers among a plurality of processing devices over a predetermined number of data carrying channels according to claim 6 or 8 wherein the step of modifying the non-interfering data transfer schedule signal responsive to the determined correlations comprises:

altering the data carrying channel interferences correlation signal array by setting the values of selected elements to zero;

generating a signal corresponding to a location of the largest value element in the altered data carrying channel interferences correlation signal array, and modifying the non-interfering data transfer schedule signal responsive to the determined correlations responsive to the location of the largest value element in the altered data carrying channel interferences correlation signal array.

10. A method for scheduling message transfers among a plurality of processing devices over a predetermined number of message carrying channels according to claim 6 or 8 wherein the step of reforming the signal identifying the interferences in message carrying channels among the message transfer requests responsive to the determined correlations comprises altering the message carrying channel interferences correlation signal array of setting the values of selected elements to zero generating a signal corresponding to a location of the largest value element in the altered message carrying channel interferences correlation signal array, and modifying the signal identifying the interferences in message carrying channels among the message transfer requests responsive to the signal corresponding to the location of the largest value element in the altered message carrying channel interference correlation signal array.

11. Apparatus for allocating resource use in a data transfer process among a plurality of data processors having a plurality of tasks comprising;

a plurality of data processing devices;

a plurality of communication channels for interconnecting the plurality of data processing devices;

control apparatus for controlling transfer of data between individual ones of the data processing devices and including;

means for storing signals representative of data transfer resources used in the process;

means for storing signals representative of the data transfer tasks of the process;

means responsive to the stored resource and task signals for generating a signal identifying interferences in resource use among the tasks;

means for generating a signal representing an initial non-interfering allocation of resources to the plurality of tasks; and mean for determining the correlations in the signal identifying the interferences of resource use among the tasks, means for comparing the determined correlations to predetermined criteria, means for modifying the non-interfering allocation of resource use signal responsive to the determined correlation, means for reforming the signal identifying the interferences of resource use among the tasks responsive to the determined correlations, and the control apparatus being operative for iteratively operating the determining, comparing, modifying and reforming means until the determined correlations meet the predetermined criteria in the comparing step means for scheduling use of resources.

12. Apparatus for allocating resource use in a data transfer process among a plurality of data processors having a plurality of tasks according to claim 11 wherein the means for generating a signal identifying the interferences of resource use among the tasks includes means for forming a set of signals each indicative of a concurrent requirement for at least one resource by two or more of the plurality of tasks.

13. Apparatus for allocating resource use in a data transfer process among a plurality of data processors having a plurality of tasks according to claim 12 wherein the means for forming a set of signals each indicative of a concurrent requirement for at least one resource by two or more of the plurality of tasks comprises means for generating an array of signals each representing the resource interference between a pair of the plurality of tasks.

14. Apparatus for allocating resource use in a data transfer process among a plurality of data processor having a plurality of tasks according to claim 11 wherein the means for determining the correlations of the identified interferences of resource use among the tasks comprises means for forming a signal representative of the compatibility in resource use among the plurality of tasks.

15. Apparatus for allocating resource use in a data transfer process among a plurality of data processors having a plurality of tasks according to claim 14 wherein the means for forming the compatibility signal comprises means for generating an array of first signals each representative of the compatibility in resource use between a selected task and the plurality of tasks responsive to the identified interferences in resource use among the tasks and comprising a set of element signals, each element signal having a value representative of the compatibility in resource use between the selected task and one of the plurality of tasks.

16. Apparatus for allocating resource use in a data transfer process among a plurality of data processors having a plurality of tasks according to claim 15 wherein the means for determining the correlations of the identified interferences of resource use among the tasks further comprises means for forming a resource interference correlation signal responsive to the first signal array.

17. Apparatus for allocating resource use in a data transfer process among a plurality of data processors having a plurality of tasks according to claim 15 wherein the compatibility signal forming means further comprises means for forming a second signal array each representative of the incompatibility in resource use between a selected task and the plurality of tasks and comprising a set of element signals each signal having a value representative of the incompatibility in resource use between the selected task and one of the plurality of tasks.

18. Apparatus for allocating resource use in a data transfer process among a plurality of data processors having a plurality of tasks according to claim 17 wherein the means for determining the correlations of the identified interferences of resource use among the tasks further comprises means for combining the first and second signal arrays to generate a resource use correlation signal array.

19. Apparatus for allocating resource use in a data transfer process among a plurality of data processors having a plurality of tasks according to claim 16 or claim 18 wherein the means for modifying the non-interfering allocation of resource use signal comprises:

means for altering the resource correlation signal array by setting the values of selected elements to zero.

means for generating a signal corresponding to a location of the largest value element in the altered resource use correlation signal array, and means for modifying the non-interfering allocation of resource use signal responsive to the location of the largest value element in the altered correlation signal array.

20. Apparatus for allocating resource use in a data transfer process among a plurality of data processors having a plurality of tasks according to claim 16 or claim 18 wherein means for reforming the signal identifying the interferences of resource use among the tasks responsive to the determined correlations comprises:

means for altering the resource correlation signal array by setting the values of selected elements to zero, means for generating a signal corresponding to a location of the largest value element in the altered resource use correlation signal array, and means for modifying the signal identifying the interferences of resource use among the tasks responsive to the signal corresponding to the location of the largest value element in the altered correlation signal array.

21. A multi processor data processing network with controlled allocation of data transfers between processor devices; comprising:

a plurality of data processing devices;

a first communication bus coupled, via a first plurality of switches, to input and receive data from the plurality of data processing switches;

a second communication bus coupled, via a second plurality of switches, to input and receive data from the plurality of data processing switches;

a control unit connected to control the first and second plurality of switches and operative to control data communication between individual ones of the plurality of data processing devices; including:

means for determining an interference between data transfers among the plurality of data processing devices in the performance of a plurality of data processing tasks by generating a representative interference signal array;

means for initially assigning task performances in a sequence of time intervals by generating an allocation signal;

means for evaluating compatibility of the data processing tasks by generating a correlation signal array;

means for optimizing task allocations by generating a series of modified correlation signal arrays with each array having fewer elements until all elements are zero and deriving a modified interference signal array therefrom;

means for scheduling data transfers;

means for performing said transfers.

22. A multi processor data processing network as claimed in claim 21, comprising:

the means for determining an interference includes;

means for generating an interference matrix signal with unity elements denoting interferences between available task performance resources; and the means for optimizing task allocations includes;

means for modifying the allocation signal to provide an optimun task sequence.

* * * * *